Oct. 13, 1953     S. J. SPURGEON     2,655,252
SELF-ALIGNING IDLER FOR CONVEYERS AND THE LIKE
Filed July 10, 1952     2 Sheets—Sheet 1

INVENTOR.
SAMUEL J. SPURGEON
BY *Jennings & Carter*
ATTORNEYS

Oct. 13, 1953 S. J. SPURGEON 2,655,252
SELF-ALIGNING IDLER FOR CONVEYERS AND THE LIKE
Filed July 10, 1952 2 Sheets-Sheet 2

INVENTOR.
SAMUEL J. SPURGEON
BY
ATTORNEYS

Patented Oct. 13, 1953

2,655,252

UNITED STATES PATENT OFFICE 2,655,252

SELF-ALIGNING IDLER FOR CONVEYERS AND THE LIKE

Samuel J. Spurgeon, Birmingham, Ala.

Application July 10, 1952, Serial No. 298,075

9 Claims. (Cl. 198—202)

My present invention relates to self aligning idler rolls for belt conveyors or the like.

In the art to which this invention relates it has been proposed to mount the conveyor idler on a supporting frame which is pivoted adjacent its longitudinal center for movement in a horizontal plane, diagonally of the belt. At the ends of the idler, in position to be engaged by the moving belt when the belt is in uncentered position, there have been placed auxiliary rollers. In such mechanism, when the belt becomes uncentered relative to the main idler it engages the auxiliary roller on the off-center side. This causes the entire frame to pivot in a direction to cause the belt to run back to centered position. In such prior art devices the auxiliary rollers have had no positive means causing them to offer added resistance to rotation when engaged by the belt. Further, the usual problem relative to bearing wear has been present in connection with the mounting of such auxiliary rollers. It has been found that it is just as essential, in order to assure long life to the apparatus as a whole, that the auxiliary rollers be provided with good seals for the bearings thereof in the same manner as the main idler. In prior devices this has been a considerable problem and insofar as I am aware has not been effectively met.

In view of the foregoing it is the prime object of my invention to provide a self-aligning idler having auxiliary rollers at each end thereof, together with means to rotate the auxiliary rollers oppositely to the direction of rotation of the idler, thus materially increasing the drag on the belt when the same contacts such auxiliary roller, thereby causing a more positive rocking action of the idler frame to move it quickly and effectively toward a position to realign the belt.

A more specific object is to provide apparatus of the character designated in which the auxiliary rollers are driven by means of a planetary drive arrangement which may consist of gears or the like, but which in preferred form consists of the inner and outer races of a ball bearing together with means to hold the balls therebetween against translatory movement in a circular path, whereby the balls serve effectively as toothless, nonpositively engaged planetary drive members, thus causing the outer race to rotate opposite to the inner race in the manner hereinafter more specifically appearing.

A further specific object is to provide apparatus of the character designated in which the inner race of the ball bearing is mounted for rotation with the idler and the outer race is mounted for rotation with the auxiliary roller, the balls being held rotatably but nontranslatably fixed between the races by a stationary retainer mounted on a suitable part of the apparatus, for instance on the non-rotating axle which supports both the idler and auxiliary rollers.

My invention contemplates the provision of seals for the antifriction bearings of the idler and the planetary ball bearings of the auxiliary roll which shall be especially effective to prevent the ingress of foreign matter and the egress of lubricant, assuring long trouble free life for both bearings.

A further object is to provide apparatus of the character designated which shall embody at each end of the idler a main idler supporting bearing and an inner seal adjacent thereto, a planetary ball bearing supporting the auxiliary roller and a second seal coacting with the axle which is effective to seal the planetary ball bearing and also to provide an auxiliary seal for the idler bearing, spaced from the built in seals thereof, thus providing recesses for receiving lubricant which contacts the outer sides of the built in seals of the main idler bearings.

Apparatus illustrating features of my invention is shown in the accompanying drawings forming a part of this application in which.

Figure 2:
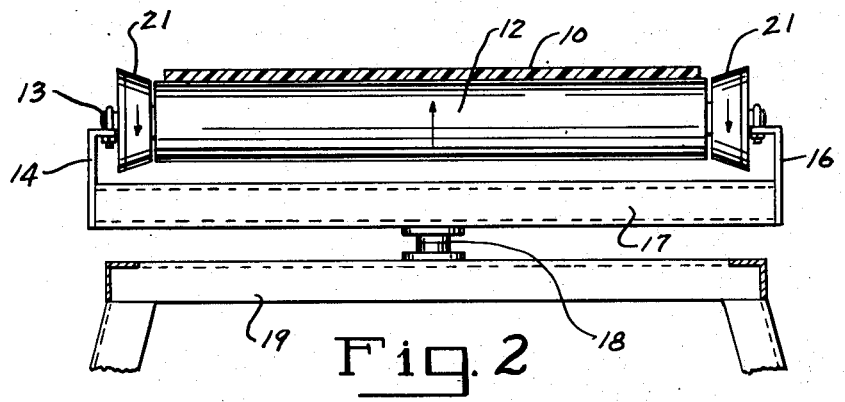
Fig. 2 is a detail sectional view taken generally along line II—II of Fig. 1.
Figure 1:
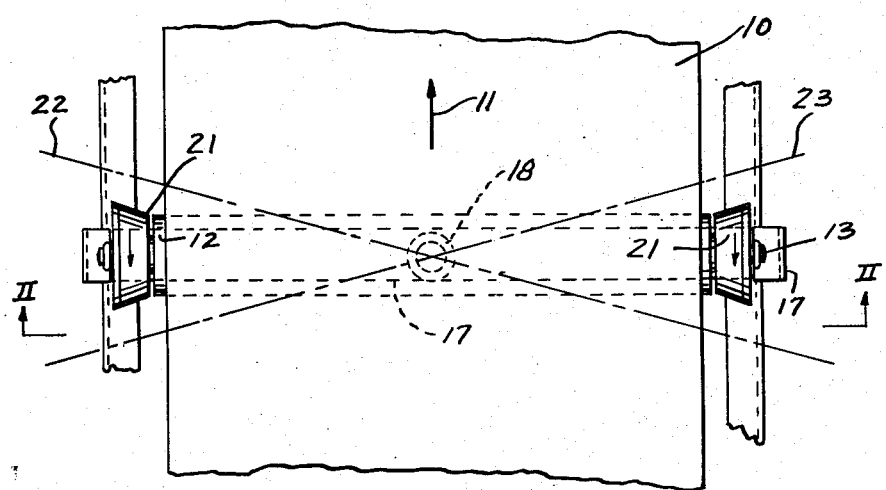
Fig. 1 is a plan view, partly broken away, illustrating a conveyor belt return idler embodying my improved auxiliary centering rollers.

Referring now to the drawings for a better understanding of my invention and more particularly to Figs. 1 and 2, I show a belt 10 of a belt conveyor which for the purpose of illustration may be moving in the direction of the arrow 11. The belt 10 is supported on an idler roll 12 which may be mounted on a fixed, non-rotating axle 13. The axle 13 is supported at each end on brackets 14 and 16 in turn mounted on the end of a cross member 17. The member 17 is supported adjacent its center on a bearing 18 in turn supported by sub-framework 19.

Mounted for rotation in the manner presently to be shown, adjacent each end of the idler 12 are auxiliary rollers 21, both of which are identical and both of which are identically mounted as will later appear. In the manner later also to appear, in the event the belt 10 becomes uncentered to the left as viewed in Fig. 1 it will be seen that its left hand edge engages the left hand one of the auxiliary rollers 21. As will be later explained, this tends to rock the entire frame 17 to the position shown by the dot-dash line 22 in Fig. 1. When the belt contacts the opposite roller 21 the frame 17 rocks the position shown by the dot-dash line 23. In either event, the belt re-centers itself and the frame 17 rocks back to normal position when the belt becomes disengaged from the rollers 21.

Figure 3:
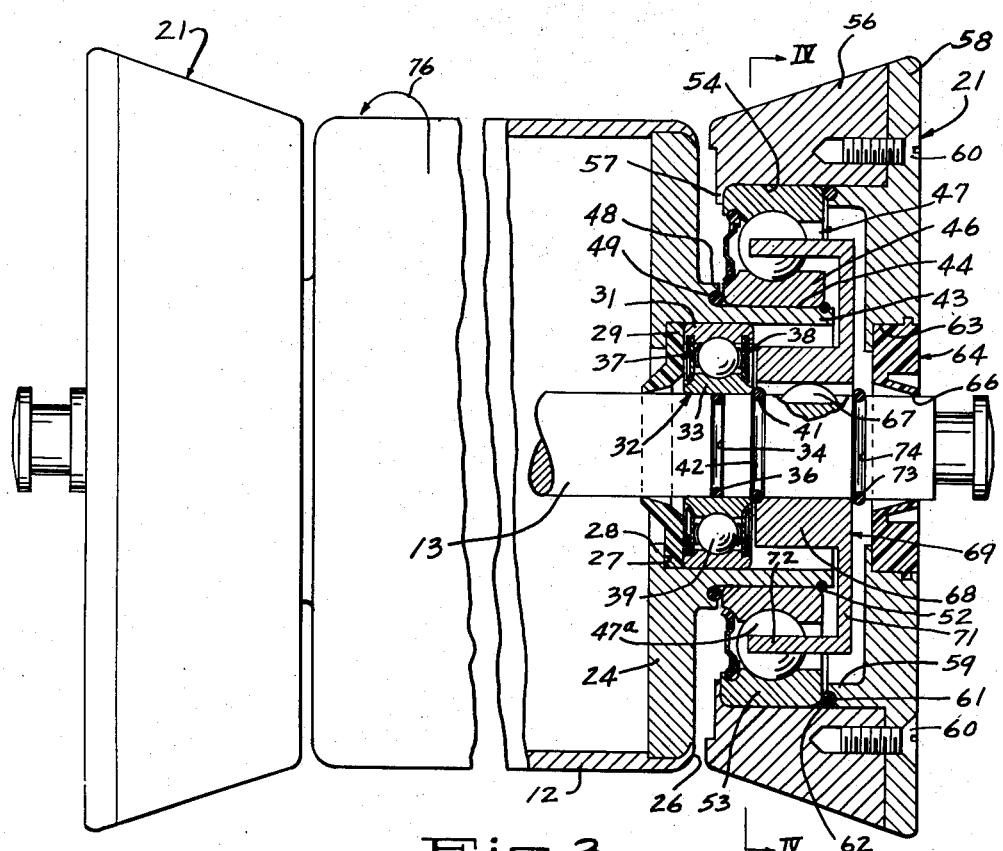
Fig. 3 is an enlarged fragmental plan view of one of the idler and auxiliary roller assemblies, one end of the idler and the associated auxiliary roller being in section; and, Fig. 4 is an end elevation view of the retainer for the planetary ball bearing member, the view being taken in the direction of the arrow IV—IV of Fig. 3 and the balls of the bearing being indicated in dotted lines.
Figure 4:
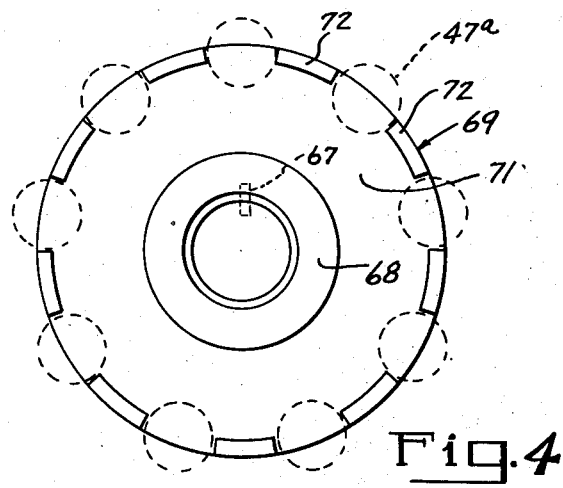

Referring now more particulary to Figs. 3 and 4 it will be seen that the idler 12 is provided with a head 24. In view of the fact that each end of the idler and each of the auxiliary rollers 21 is identical, a description of one will suffice for both. The head 24 may be secured to the idler roll shell by forming over the end of the shell as indicated at 26.

The head 24 is provided with a bearing recess 27 having a stop shoulder 28 at the inner end thereof. Fitting in the recess and with a side abutting the shoulder 28 is a sealing washer 29 having a portion 30 disposed with a close running fit about the stationary axle 13.

Fitting within the bearing recess 27 is the outer race 31 of an anti-fritcion bearing indicated generally by the numeral 32. The outer race is held against the inner side of the sealing washer 29 and the inner race 33 thereof fits over the axle 13. In order to prevent rotation of the inner race relative to the axle 13 I may groove the axle as indicated at 34 and provide therein a ring 36 of rubber-like material. When the inner race 33 is slid over the ring 36, the friction of the rubber holds the inner race against rotation. If desired, and as is customary, the bearing 32 may be provided with built in seals 37 and 38 thus to protect the balls 39 against the ingress of foreign matter and the egress of lubricant. The bearing may be held non-slidable relative to the axle 13 by means of a locking ring 41 fitting in a groove 42 in the axle.

Projecting outwardly from the bearing recess of the head 24 is a sleeve 43 providing a seat 44 for the inner race 46 of another anti-friction bearing indicated generally by the numeral 47. At its inner end the seat 44 has a vertical shoulder 48. The shoulder 48 may be provided with an annular groove disposed to receive a packing ring 49.

The inner race 46 of the bearing 47 is mounted on the seat 44 and is held thereon by means of a locking ring 52. The ring 52 holds the opposite edge of the inner race in sealing engagement with the ring 49.

The outer race 53 of the bearing 47 fits in the bore 54 of the tapered shell 56 forming the major portion of the auxiliary roller 21. The bore of the tapered ring 56 may be provided with a stop shoulder 57 against which the inner edge of the outer race of the bearing 47 rests when assembled therein.

Fitting adjacent the outer face of the ring 56 is an end plate 58 which has an inwardly projecting shoulder 59. Plate 58 is secured to the ring 56 by means of screws 60. The shoulder 59 may be grooved at 61 to receive a packing ring 62. The groove may be formed so that the ring contacts both the adjacent edge of the outer race 53 of bearing 47 and the bore of the ring 56. The plate 58 is provided with a centrally disposed hole 63 in which fits a seal 64 having a portion 66 fitting with a close running fit about the axle 13.

Non-rotatably secured to the axle 13 by means of a key 67 is the boss 68 of a retainer indicated generally by the numeral 69 for holding the balls 47a of the bearing 47 against translatory movement between the races 46 and 53. As shown more clearly in Fig. 4, the member 69 comprises a radial plate portion 71 formed integrally with the boss 68. Turned inwardly of the plate portion 71 are a plurality of spaced fingers 72 adapted to reecive between them the balls 47a. Since the member 69 as a whole remains stationary it will be apparent that the individual balls 47a, while free to rotate about their own centers, are nevertheless prevented from following the customary circular path when the outer race rotates relative to the inner race. The member 69 is held against movement longitudinal of the axle 13 by means of a locking ring 73 placed in a groove 74 in the axle 13.

From the foregoing the method of constructing and using my improved self aligning idler may now be explained and understood. With the parts assembled in the manner shown in Fig. 3 of the drawing it will be apparent that if the idler 12 rotates in the direction indicated by the curved arrow 76, the two auxiliary rollers 21 rotate in an opposite direction. This is brought about due to the fact that the inner race 46 of bearing 47, being carried by the head 24 of the roll rotates the balls 47a in such manner as to drive the race 53 in the opposite direction. Since the race 53 is the part supporting and carrying the auxiliary roller it will be seen that the balls function somewhat as would gears in a planetary system. The spider-like member 69 having the fingers 72 between the balls holds them against following the outer race. Thus, while the inner surface of the balls goes in one direction, the outer surface rotates in the other. With the parts rotating oppositely in the manner illustrated, as soon as the belt 10 becomes uncentered it will be seen that it engages one of the oppositely rotating rollers 21. This adds an additional drag upon the belt at that edge and accentuates the pivoting movement of the frame 17 carrying the entire roll assembly. This has the effect of quickly realigning the belt. Further, due to the non-positive planetary action of the balls 47a, excessive wear on the edge of the belt is prevented when the same strikes one of the oppositely rotating auxiliary rollers 21. However, and as previously stated, it is within the scope of my invention to employ some means to obtain opposite rotation of the rollers 21 other than the specific means shown.

It will also be noted that the several spaces between the seals 29 and 64 may be filled with lubricant, thus to protect the seals 37 and 38 of the bearing 32 as well as to lubricate the bearing 47. While I have shown my invention associated with a flat, return idler, it is equally adapted for use on troughing idlers.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. The combination with a self-aligning idler for belt conveyors and the like wherein the idler has mounted adjacent each end auxiliary rollers disposed to be engaged by the belt when in uncentered position, of means supporting the auxiliary rollers from rotating portions of the idler, and means driven by the idler rotating the auxiliary rollers in a direction opposite the direction of rotation of the idler.

2. Apparatus as defined in claim 1 in which the means rotating the auxiliary rollers comprises a planetary friction drive connection between the idler and said rollers.

3. Apparatus as defined in claim 1 in which the means driven by the idler and rotating the auxiliary rollers comprises anti-friction bearings having inner and outer races and anti-friction members therebetween, means holding the anti-friction members translatably fixed but free for rotation between the races, means driving the inner races from the idler, and means mounting the auxiliary rollers on the outer races.

4. In an idler assembly for belt conveyors, a main belt supporting roll, anti-friction bearings having inner and outer races and balls therebetween with their inner races mounted on the ends of the main roll for rotation therewith, means holding the balls translatably fixed but free for rotation, and auxiliary rollers mounted on the outer races and disposed to be engaged by a conveyor belt when uncentered relative to the main idler.

5. In a self-aligning idler assembly for belt conveyors and the like, a main belt supporting idler, a non-rotatable supporting axle on which the idler is mounted for rotation, auxiliary rollers at each end of the main idler disposed to be contacted when the belt becomes uncentered relative to the main idler, anti-friction bearings for said auxiliary rollers embodying inner and outer races and rolling anti-friction members therebetween, means supporting the inner races from the adjacent ends of the main idler for rotation therewith, means supporting the auxiliary rollers from the outer races, means holding the anti-friction members translatably fixed but free for rotation between the races, and means mounting the entire assembly for pivotal movement diagonally of the belt.

6. Apparatus as defined in claim 5 in which the means holding the anti-friction members translatably fixed but free for rotation comprises a holding member secured non-rotatably to the axle, and portions on the holding member engaging the anti-friction members and holding them against bodily translatory movement between the respective races.

7. In an assembly of the character designated, a main conveyor belt idler having end heads, a stationary axle on which the idler is mounted for rotation, outstanding cylindrical extensions on the end heads, anti-friction bearings having inner and outer races and balls therebetween with the inner races thereof mounted non-rotatably on the extension, auxiliary rollers non-rotatably mounted on the outer races of the bearings, a holding member secured non-rotatably to the axle and having fingers thereon entering between the balls and holding them translatably fixed but rotatable between the races, and lubricant seals between the auxiliary rollers and the stationary axle.

8. Apparatus as defined in claim 7 in which lubricant seal means is provided at the point between the adjacent side of the inner race of the bearing supporting the auxiliary rollers and the head of the idler, and in which another lubricant seal is provided between the idler and said non-rotatable axle.

9. In an idler assembly for belt conveyors, a main belt supporting roll, anti-friction members mounted on the ends of the main roll for rotation therewith, and auxiliary rollers operatively connected to and driven by said anti-friction members in a direction opposite the direction of rotation of the idler, said auxiliary rollers being disposed to be engaged by a conveyor belt when uncentered relative to the main idler.

SAMUEL J. SPURGEON.

References Cited in the file of this patent

UNITED STATES PATENTS

| Number | Name | Date |
| --- | --- | --- |
| 270,718 | Albey | Jan. 16, 1883 |
| 2,570,364 | Mercier | Oct. 9, 1951 |

FOREIGN PATENTS

| Number | Country | Date |
| --- | --- | --- |
| 623,329 | Great Britain | May 16, 1949 |